(12) United States Patent
Lin et al.

(10) Patent No.: US 10,755,404 B2
(45) Date of Patent: Aug. 25, 2020

(54) INTEGRATED CIRCUIT DEFECT DETECTION USING PATTERN IMAGES

(71) Applicant: International Business Machines Corporation, Armonk, NY (US)

(72) Inventors: Chung-Ching Lin, White Plains, NY (US); Thomas McCarroll Shaw, Peekskill, NY (US); Peilin Song, Lagrangeville, NY (US); Franco Stellari, Waldwick, NJ (US); Thomas Anthony Wassick, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 15/834,602

(22) Filed: Dec. 7, 2017

(65) Prior Publication Data
US 2019/0180430 A1 Jun. 13, 2019

(51) Int. Cl.
*G06T 7/00* (2017.01)

(52) U.S. Cl.
CPC .... *G06T 7/001* (2013.01); *G06T 2207/10056* (2013.01); *G06T 2207/30148* (2013.01)

(58) Field of Classification Search
CPC ........... G06T 7/001; G06T 2207/10056; G06T 2207/30148
See application file for complete search history.

(56) References Cited

U.S. PATENT DOCUMENTS

| 5,838,433 | A | * | 11/1998 | Hagiwara | ........ G01N 21/95623 356/364 |
|---|---|---|---|---|---|
| 6,488,405 | B1 | | 12/2002 | Eppes et al. | |
| 6,518,571 | B2 | | 2/2003 | Talbot et al. | |
| 6,956,385 | B1 | | 10/2005 | Bruce et al. | |

(Continued)

FOREIGN PATENT DOCUMENTS

| CN | 105842611 A | 8/2016 |
|---|---|---|
| JP | 2009008396 A | 1/2009 |

OTHER PUBLICATIONS

Liebert, et al., "Failure analysis from the back side of a die," Microelectronics Reliability 41, (2001), pp. 1193-1201.

(Continued)

*Primary Examiner* — Bobbak Safaipour
(74) *Attorney, Agent, or Firm* — Amin, Turocy & Watson, LLP

(57) ABSTRACT

Techniques that facilitate integrated circuit defect detection using pattern images are provided. In one example, a system generates an equalized pattern image of a pattern image associated with a module under test based on an adaptive contrast equalization technique. The system also identifies a first set of features of the equalized pattern image based on a feature point detection technique and aligns the equalized pattern image with a reference pattern image based on the first set of features and a second set of features of the reference pattern image. Furthermore, the system compares a first set of light intensities of the equalized pattern image to a second set of light intensities of the reference pattern image to identify one or more regions of the module under test that satisfy a defined criterion associated with a defect for the module under test.

20 Claims, 10 Drawing Sheets

(56) References Cited

U.S. PATENT DOCUMENTS

| | | | |
|---|---|---|---|
| 6,995,564 B1 | 2/2006 | Ang et al. | |
| 7,616,805 B2 | 11/2009 | Matsui et al. | |
| 8,090,191 B2 | 1/2012 | Nikawa | |
| 8,224,062 B2 | 7/2012 | Ohkura et al. | |
| 2008/0094087 A1 | 4/2008 | Lee | |
| 2014/0026004 A1* | 1/2014 | Jin | G11B 20/18 714/718 |
| 2014/0212023 A1* | 7/2014 | Fujii | G06T 7/0004 382/149 |
| 2015/0124874 A1* | 5/2015 | Pace | H04N 19/167 375/240.08 |
| 2016/0259970 A1* | 9/2016 | Wee | G06K 9/00885 |
| 2017/0047195 A1* | 2/2017 | Lee | H01L 22/20 |

OTHER PUBLICATIONS

Liu, et al., "Defect Detection of IC Wafer Based on Spectral Subtraction," IEEE Transactions on Semiconductor Manufacturing, vol. 23, No. 1, Feb. 2010, 7 pages.

* cited by examiner

INTEGRATED CIRCUIT DEFECT DETECTION USING PATTERN IMAGES

BACKGROUND

The subject disclosure relates to integrated circuits, and more specifically, to detecting integrated circuit defects.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate integrated circuit defect detection using pattern images are described.

According to an embodiment, a system can comprise an equalization component, a feature point detection component, and a comparison component. The equalization component can generate an equalized pattern image of a pattern image associated with a module under test based on an adaptive contrast equalization technique. The feature point detection component can identify a first set of features of the equalized pattern image based on a feature point detection technique. The feature point detection component can also align the equalized pattern image with a reference pattern image based on the first set of features and a second set of features of the reference pattern image. The comparison component can compare a first set of light intensities of the equalized pattern image to a second set of light intensities of the reference pattern image to identify one or more regions of the module under test that satisfy a defined criterion associated with a defect for the module under test.

According to another embodiment, a computer-implemented method is provided. The computer-implemented method can comprise generating, by a system operatively coupled to a processor, an equalized pattern image of a pattern image associated with an integrated circuit based on an adaptive contrast equalization technique. The computer-implemented method can also comprise identifying, by the system, a first set of features of the equalized pattern image based on a feature point detection technique. Furthermore, the computer-implemented method can comprise aligning, by the system, the equalized pattern image with a reference pattern image based on the first set of features and a second set of features of the reference pattern image. The computer-implemented method can also comprise identifying, by the system, one or more regions of the integrated circuit associated with a defect by comparing a first set of light intensities of the equalized pattern image to a second set of light intensities of the reference pattern image.

According to yet another embodiment, a computer program product for facilitating defect detection of an integrated circuit can comprise a computer readable storage medium having program instructions embodied therewith. The program instructions can be executable by a processor and cause the processor to detect, by the processor, a location associated with the integrated circuit. The program instructions can also cause the processor to focus, by the processor, a lens of a camera at the location associated with the integrated circuit. Furthermore, the program instructions can cause the processor to acquire, by the processor, data associated with the integrated circuit. The program instructions can also cause the processor to generate, by the processor, a pattern image for the integrated circuit based on the data.

DETAILED DESCRIPTION

Figure 1:
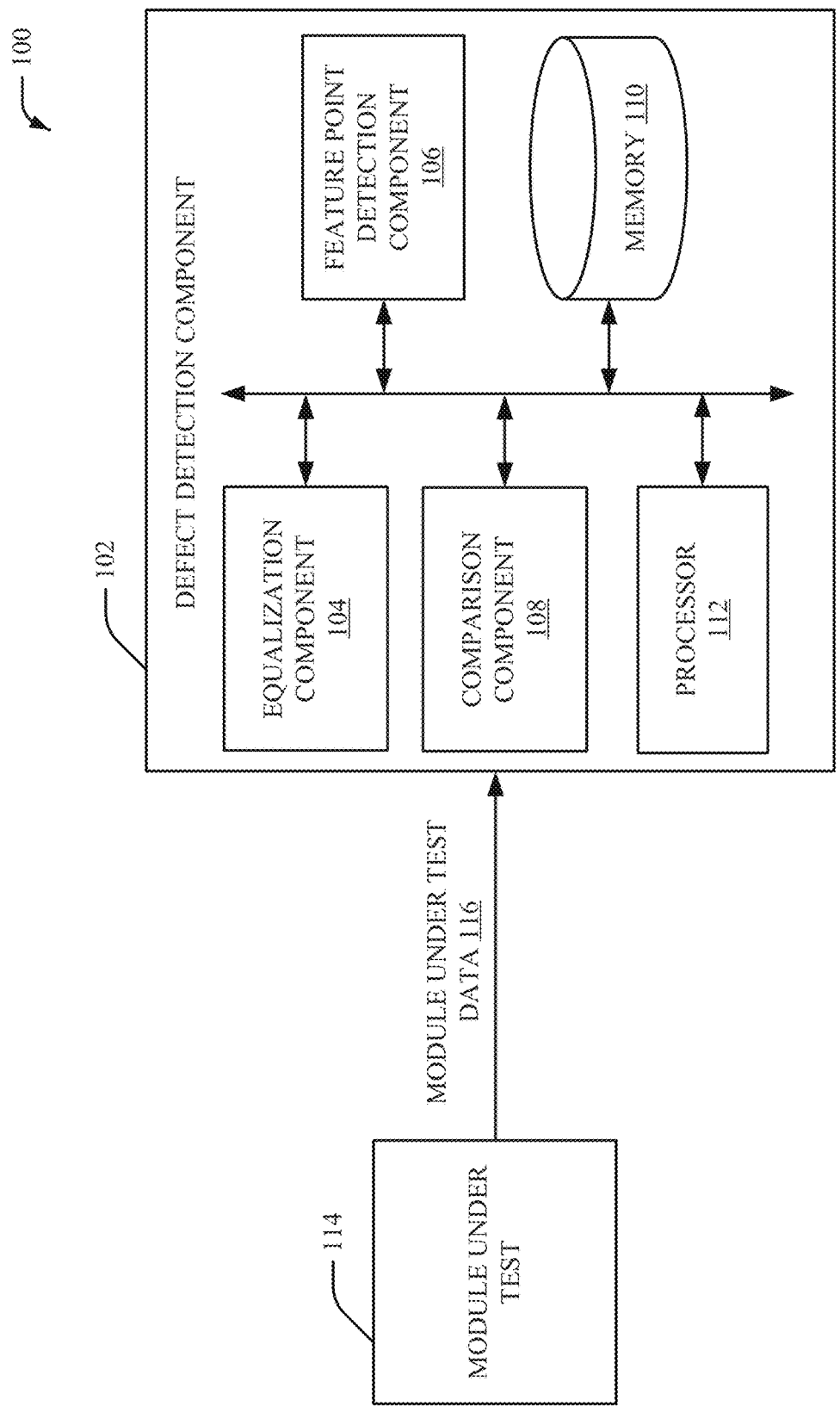
FIG. 1 illustrates a block diagram of an example, non-limiting system that includes a defect detection component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A fabrication process of an integrated circuit and/or another process associated with the integrated circuit may introduce one or more defects into the integrated circuit. As such, an inspection tool can be employed to examine an integrated circuit after a fabrication process for the integrated circuit and/or one or more other processes associated with the integrated circuit. For example, an integrated circuit that is fabricated by a fabrication process and/or undergoes another process is generally compared to a known-good reference integrated circuit (e.g., a previously fabricated integrated circuit with no defects). Generally, an existing inspection tool generates an image of an integrated circuit that is fabricated by a fabrication process and/or undergoes one or more other processes. Furthermore, a user generally evaluates the image for one or more defects. However, it is desirable to reduce an amount of time to detect one or more defects using an inspection tool. Furthermore, accuracy for detecting one or more defects in an integrated circuit using an existing inspection tool is generally unreliable.

Embodiments described herein include systems, computer-implemented methods, and computer program products that facilitate integrated circuit defect detection using one or more pattern images of the integrated circuit. In an aspect, a novel inspection tool can be provided to facilitate integrated circuit detection using pattern images. The novel inspection tool can, for example, employ one or more pattern images acquired from a backside of an integrated circuit to detect one or more defects and/or one or more degradation mechanisms that may develop during a fabrication process for the integrated circuit, an assembly process for the integrated circuit, a reliability testing process for the integrated circuit, a life testing process for the integrated circuit, usage of the integrated circuit, and/or another process associated with the integrated circuit. The integrated circuit can be, for example, a module under test. In an embodiment, Near-InfraRed (NIR) illumination and a camera can be employed to allow one or more pattern images to be acquired through a backside of an integrated circuit. The one or more pattern images can be, for example, one or more reflected pattern images. In one example, the camera can be an indium gallium arsenide camera. In another embodiment, a Laser Scanning Microscope (LSM) using a NIR light source can be employed to create one or more pattern images of an integrated circuit. The one or more pattern images can be employed to facilitate improved detection of one or more defects in an integrated circuit. Furthermore, in a scenario where an integrated circuit is fabricated during a batch fabrication process, identification of one or more defects in the batch fabrication process can be detected earlier in the batch fabrication process. Moreover, in an embodiment where an integrated circuit is a flip-chip where access to a front-side of the flip-chip is not available or features of interest for the flip-chip are blocked by other components of the flip-chip (e.g., a wiring layer of the flip-chip), detection of one or more defects in the flip-chip can be improved.

In an embodiment, the novel inspection tool disclosed herein can provide automation of a defect detection process for an integrated circuit. For example, the novel inspection tool disclosed herein can provide automated data acquisition and/or automated data analysis. The automated data acquisition can include, for example, automated corner and/or edge detection of an integrated circuit, automated stepping of a stage for a defect detection process associated with an integrated circuit, automated focusing of a tool at one or more steps of a defect detection process associated with an integrated circuit, automated image acquisition and/or storage for a defect detection process associated with an integrated circuit, etc. The automated data analysis can include, for example, image filtering and/or contrast improvement for an integrated circuit, automated image rectification for an integrated circuit, automated image registration and/or transformation for an integrated circuit, image subtraction associated with an integrated circuit, defect detection associated with an integrated circuit, etc. As such, a number of defects for an integrated circuit can be reduced. For instance, accuracy for detecting one or more defects in an integrated circuit can be improved. Furthermore, performance such as, for example, processing performance (e.g., processing characteristics) of an integrated circuit can be improved. Efficiency of an integrated circuit, quality of an integrated circuit (e.g., fabrication quality of an integrated circuit), and/or reliability of an integrated circuit can also be improved. Moreover, an amount of time to identify one or more defects in an integrated circuit can be reduced.

FIG. 1 illustrates a block diagram of an example, non-limiting system 100 that facilitates integrated circuit defect detection using one or more pattern images of the integrated circuit in accordance with one or more embodiments described herein. In various embodiments, the system 100 can be a system associated with technologies such as, but not limited to, integrated circuit technologies, inspection tool technologies, defect detection technologies, data acquisition technologies, data analysis technologies, image processing technologies, image analysis technologies, computer technologies, machine learning technologies, artificial intelligence technologies, digital technologies, and/or other technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a defect detection component, etc.) for carrying out defined tasks related to detection of one or more defects associated with an integrated circuit. The system 100 and/or components of the system can be employed to solve new problems that arise through advancements in technologies mentioned above, fabrication of integrated circuits, and/or computer architecture, and the like. One or more embodiments of the system 100 can provide technical improvements to integrated circuit systems, inspection tool systems, defect detection systems, data acquisition systems, data analysis systems, image processing systems, image analysis systems, computer systems, machine learning systems, artificial intelligence systems, digital systems, and/or other systems. One or more embodiments of the system 100 can also provide technical improvements to an integrated circuit that is a module under test by improving processing performance of the integrated circuit and/or improving processing efficiency of the integrated circuit.

In the embodiment shown in FIG. 1, the system 100 can include a defect detection component 102. As shown in FIG. 1, the defect detection component 102 can include an equalization component 104, a feature point detection component 106, and a comparison component 108. Aspects of the defect detection component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the defect detection component 102 can also include memory 110 that stores computer executable components and instructions. Furthermore, the defect detection component 102 can include a processor 112 to facilitate execution of the instructions (e.g., computer executable components and corresponding instructions) by the defect detection component 102. As shown, the equalization component 104, the feature point detection component 106, the comparison component 108, the memory 110 and/or the processor 112 can be electrically and/or communicatively coupled to one another in one or more embodiments. Additionally, in certain embodiments, the system 100 can also include a module under test 114. The module under test 114 can be, for example, a device under test. In one example, the module under test 114 can be an integrated circuit (e.g., an integrated circuit under test).

The defect detection component 102 can receive module under test data 116. The module under test data 116 can be associated with the module under test 114. For instance, the module under test data 116 can be generated by analyzing the module under test 114. In an embodiment, the module under test data 116 can include one or more pattern images for the module under test 114. In an aspect, the module under test data 116 can be generated by analyzing the module under test 114. For example, in an embodiment, the module under test data 116 can be generated by an inspection tool that analyzes the module under test 114 via an infrared camera and near-infrared illumination. In one embodiment, the module under test data 116 can be received from a live tool acquisition associated with the module under test 114. In another embodiment, the module under test data 116 can be received from a databased of saved pattern images.

In an embodiment, the equalization component 104 can generate an equalized pattern image of a pattern image included in the module under test data 116. The pattern image can be a pattern image of the module under test 114. The equalized pattern image can be generated to reduce differences in the pattern image due to illumination of the module under test 114 to capture the pattern image and/or to improve image contrast of the pattern image. In an aspect, the equalization component 104 can generate the equalized pattern image of the pattern image included in the module under test data 116 based on an adaptive contrast equalization technique. The adaptive contrast equalization technique can be an imaging processing technique that improves image contrast (e.g., luminance and/or hue differences) associated with the module under test data 116. For example, the equalized pattern image can comprise improved contrast as compared to the pattern image included in the module under test data 116. Furthermore, in an embodiment, the adaptive contrast equalization technique can compute one or more histograms associated with the module under test data 116 to facilitate generation of the equalized pattern image. The one or more histograms can be one or more graphical representations of a distribution of the module under test data 116. Additionally, the equalization component 104 can generate an equalized reference pattern image of a reference pattern image. The reference pattern image can be a known-good reference pattern image associated with a previously analyzed and/or fabricated module under test with no defects. In an aspect, the equalization component 104 can generate the equalized reference pattern image of the reference pattern image based on the adaptive contrast equalization technique. In certain embodiments, the equalization component 104 can additionally perform a rectification process to further adjust the equalized reference pattern image. For example, the rectification process can include a RADON transform that rotates one or more portions of the equalized reference pattern image. In one example, the equalization component 104 can acquire the module under test data 116 (e.g., the pattern image) from a camera that captures the module under test data 116 using near-infrared illumination. In another example, the equalization component 104 can acquire the module under test data 116 (e.g., the pattern image) from a laser scanning microscope that captures the module under test data 116 using near-infrared illumination. In yet another example, the equalization component 104 can acquire the module under test data 116 (e.g., the pattern image) from a microscope system that acquires the module under test data 116 through a silicon substrate of the module under test 114.

The feature point detection component 106 can identify a first set of features of the equalized pattern image based on a feature point detection technique. In an embodiment, the feature point detection component 106 can identify the first set of features of the equalized pattern image based on a speeded-up robust features (SURF) technique. For example, the SURF technique can be a local feature detector algorithm that identifies the first set of features of the equalized pattern image. In another embodiment, the feature point detection component 106 can identify the first set of features of the equalized pattern image based on a Harris-Stephens corner detection technique. For example, the Harris-Stephens corner detection technique can be an interest point detection algorithm that identifies the first set of features of the equalized pattern image. However, it is to be appreciated that the feature point detection component 106 can identify the first set of features of the equalized pattern image based on another feature point detection technique. The first set of features of the equalized pattern image can be a set of feature points in the equalized pattern image that satisfy a defined criterion with respect to features of the module under test 114. Additionally, feature point detection component 106 can identify a second set of features of the equalized reference pattern image based on the feature point detection technique. In an embodiment, the feature point detection component 106 can identify the second set of features of the equalized reference pattern image based on the SURF technique. For example, the SURF technique can be a local feature detector algorithm that identifies the second set of features of the equalized reference pattern image. In another embodiment, the feature point detection component 106 can identify the second set of features of the equalized reference pattern image based on the Harris-Stephens corner detection technique. For example, the Harris-Stephens corner detection technique can be an interest point detection algorithm that identifies the second set of features of the equalized reference pattern image. However, it is to be appreciated that the feature point detection component 106 can identify the second set of features of the equalized reference pattern image based on another feature point detection technique. The second set of features of the equalized reference pattern image can be a set of feature points in the equalized reference pattern image that satisfy a defined criterion with respect to features of a reference integrated circuit.

The feature point detection component 106 can also align the equalized pattern image with the equalized reference pattern image based on the first set of features of the equalized pattern image and the second set of features of the equalized reference pattern image. For example, the feature point detection component 106 can match the first set of features of the equalized pattern image to the second set of features of the equalized reference pattern image to align the equalized pattern image and the equalized reference pattern image. Furthermore, in certain embodiments, the feature point detection component 106 can employ the first set of features of the equalized pattern image and the second set of features of the equalized reference pattern image to compute an optimal transform for the equalized pattern image and/or the equalized reference pattern image. For instance, in an embodiment, the feature point detection component 106 can transform the equalized pattern image and/or the equalized reference pattern image to facilitate alignment of the equalized pattern image and the equalized reference pattern image.

The comparison component 108 can compare a first set of light intensities of the equalized pattern image to a second set of light intensities of the equalized reference pattern image to identify one or more regions of the module under test 114 that satisfy a defined criterion associated with a defect for the module under test 114. For example, a defined difference in light intensities between the equalized pattern image and the equalized reference pattern image can indicate a location for one or more defects associated with the module under test 114. In an embodiment, the comparison component 108 can determine an image difference between the equalized pattern image and the equalized reference pattern image based on the first set of light intensities of the equalized pattern image to the second set of light intensities of the equalized reference pattern image. The comparison component 108 can calculate the image difference to identify light intensity differences between the equalized pattern image and the equalized reference pattern image. In one example, a determination that a difference between the first set of light intensities of the equalized pattern image and the second set of light intensities of the equalized reference pattern image corresponds to a defined threshold value can indicate a defect for the module under test 114. In an embodiment, the comparison component 108 can compare the first set of features of the equalized pattern image to the second set of features of the equalized reference pattern image to determine a set of light intensity differences between the equalized pattern image and the equalized reference pattern image. The set of light intensity differences can correspond to defect locations associated with the module under test 114. In an embodiment, the defect detection component 102 can be associated with post-processing of a pattern image associated with the module under test 114. In another embodiment, the defect detection component 102 can be associated with real-time analysis of the module under test 114. For example, the defect detection component 102 can be performed in real-time after a new pattern image associated with a portion of the module under test 114 is acquired. In certain embodiments, the defect detection component 102 can employ one or more decision making algorithms to determine whether to stop further data acquisition (e.g., because a defect has been identified in the module under test 114).

It is to be appreciated that the defect detection component 102 (e.g., the equalization component 104, the feature point detection component 106 and/or the comparison component 108) performs a defect detection process associated with the module under test 114 that cannot be performed by a human (e.g., is greater than the capability of a single human mind). For example, an amount of data processed, a speed of processing of data and/or data types processed by the defect detection component 102 (e.g., the equalization component 104, the feature point detection component 106 and/or the comparison component 108) over a certain period of time can be greater, faster and different than an amount, speed and data type that can be processed by a single human mind over the same period of time. The defect detection component 102 (e.g., the equalization component 104, the feature point detection component 106 and/or the comparison component 108) can also be fully operational towards performing one or more other functions (e.g., fully powered on, fully executed, etc.) while also performing the above-referenced defect detection process. Moreover, the module under test data 116 and/or defect regions of the module under test 114 determined by the defect detection component 102 (e.g., the equalization component 104, the feature point detection component 106 and/or the comparison component 108) can include information that is impossible to obtain manually by a user.

Figure 2:
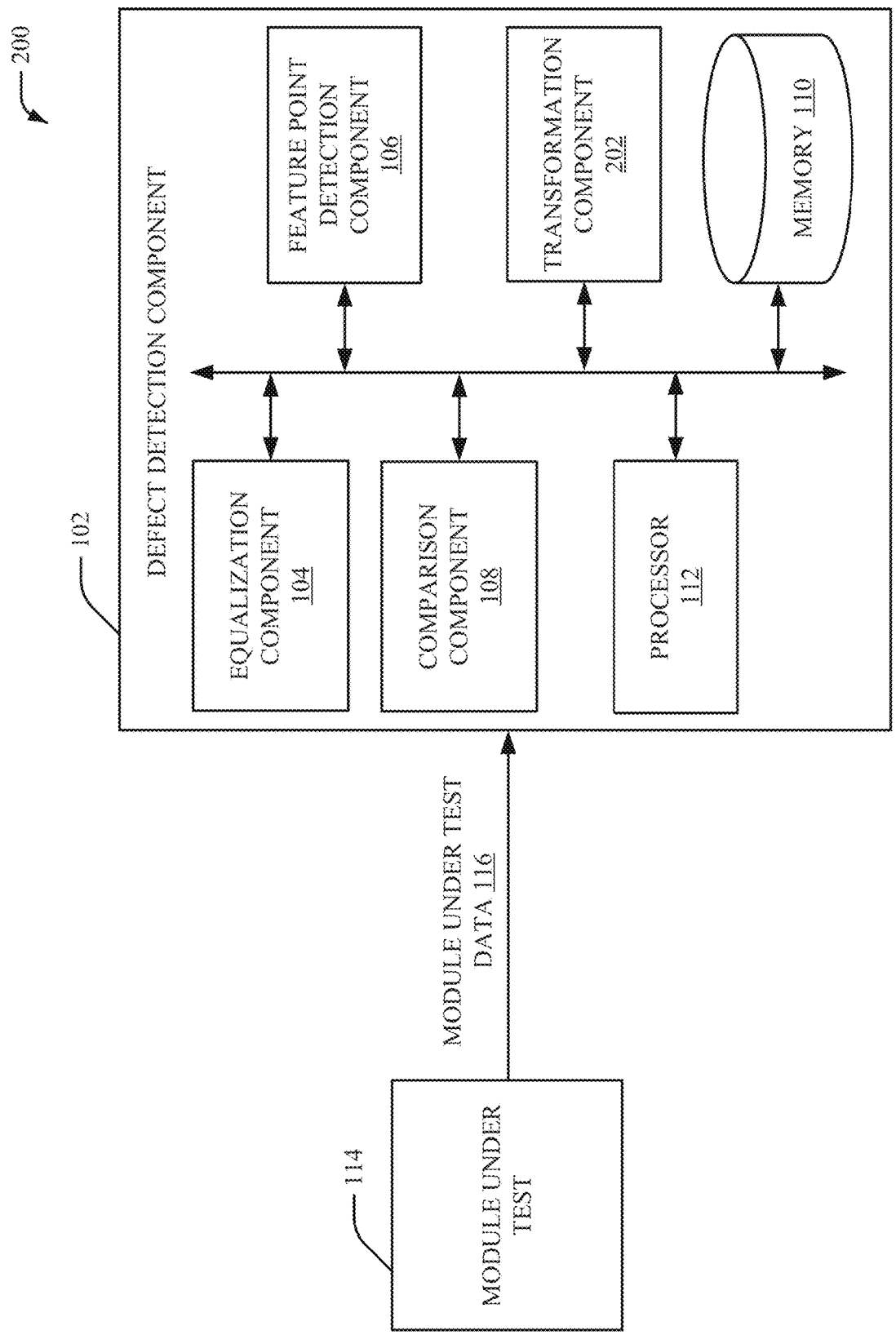
FIG. 2 illustrates a block diagram of another example, non-limiting system that includes a defect detection component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the defect detection component 102. The defect detection component 102 can include the equalization component 104, the feature point detection component 106, the comparison component 108, the memory 110, the processor 112 and a transformation component 202. The transformation component 202 can transform the equalized pattern image to facilitate calculation of an image difference between the equalized pattern image and the equalized reference pattern image. In an aspect, the transformation component 202 can transform the equalized pattern image to align the first set of features of the equalized pattern image and the second set of features of the equalized reference pattern image. In one example, the transformation component 202 can rotate the equalized pattern image. In one example, the transformation component 202 can translate the equalized pattern image. In yet another example, the transformation component can modify a size of the equalized pattern image. For instance, based on the matching feature points between the equalized reference pattern image and the equalized pattern image, the transformation component 202 can calculate transformation parameters so that the equalized pattern image is translated and/or rotated to match the equalized reference pattern image. In an embodiment, the transformation component 202 can remove one or more pixels from the equalized pattern image. The transformation component 202 can, for example, remove a set of pixels from the image difference that satisfy a defined criterion associated with a camera that captures the pattern image to facilitate identification of the one or more regions of the module under test that satisfy the defined criterion. For example, the transformation component 202 can employ a list of pixels associated with the camera that captured the pattern image to remove one or more pixels from the equalized pattern image. The list of pixels can include, for example, one or more pixels identified as a defect in the camera, one or more pixels associated with a dust particle, etc. For instance, one or more camera pixels may be defective and may introduce a defect that is not located on the module under test 114.

In an embodiment, the transformation component 202 can modify the image difference to facilitate identification of the one or more regions of the module under test that satisfy the defined criterion. For example, the transformation component 202 can crop the image difference to reduce the image difference to an area of interest for analysis. In another embodiment, the transformation component 202 can filter the image difference to facilitate identification of the one or more regions of the module under test that satisfy the defined criterion. For example, the transformation component 202 can apply a low pass filter to the image difference. In another example, the transformation component 202 can apply a median filter to the image difference. In yet another example, the transformation component 202 can apply a Gaussian filter to the image difference. However, it is to be appreciated that the transformation component 202 can employ another type of filter to filter the image difference. In yet another embodiment, the transformation component 202 can apply a detection threshold to the image difference to remove low signal-to-noise ration regions of the image difference that are not associated with a defect for the module under test 114.

Figure 3:
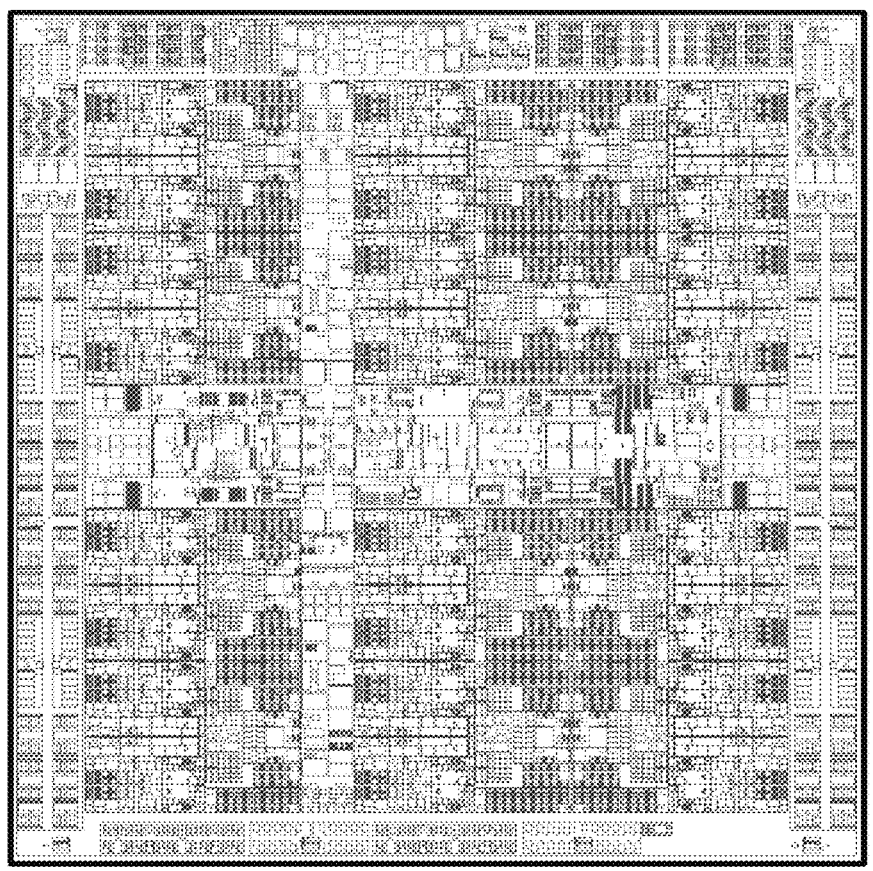
FIG. 3 illustrates an example, non-limiting pattern image in accordance with one or more embodiments described herein.

FIG. 3 illustrates a block diagram of an example, non-limiting pattern image 300 in accordance with one or more embodiments described herein. Repetitive description of like elements employed in other embodiments described herein is omitted for sake of brevity.

The pattern image 300 can be, for example, a pattern image for a module under test (e.g., the module under test 114). For instance, the pattern image 300 can be a pattern image of an integrated circuit. The pattern image 300 can illustrate one or more structural features of the module under test (e.g., the module under test 114). For example, one or more components and/or one or more electrical connections of the module under test (e.g., the module under test 114) can be illustrated by the pattern image 300. In another aspect, the pattern image can be a reflected light pattern image. For example, the pattern image 300 can be a reflected light pattern image that is acquired in the NIR spectrum. The reflected light patterns can facilitate illustration of the one or more structural features of the module under test (e.g., the module under test 114). In an aspect, the pattern image 300 can be obtained from a backside of a module under test (e.g., a backside of the module under test 114). In one embodiment, NIR illumination and a camera can be employed to generate the pattern image 300. For instance, the camera can be an indium gallium arsenide camera. In another embodiment, a LSM using a NIR light source can be employed to generate the pattern image.

Figure 4:
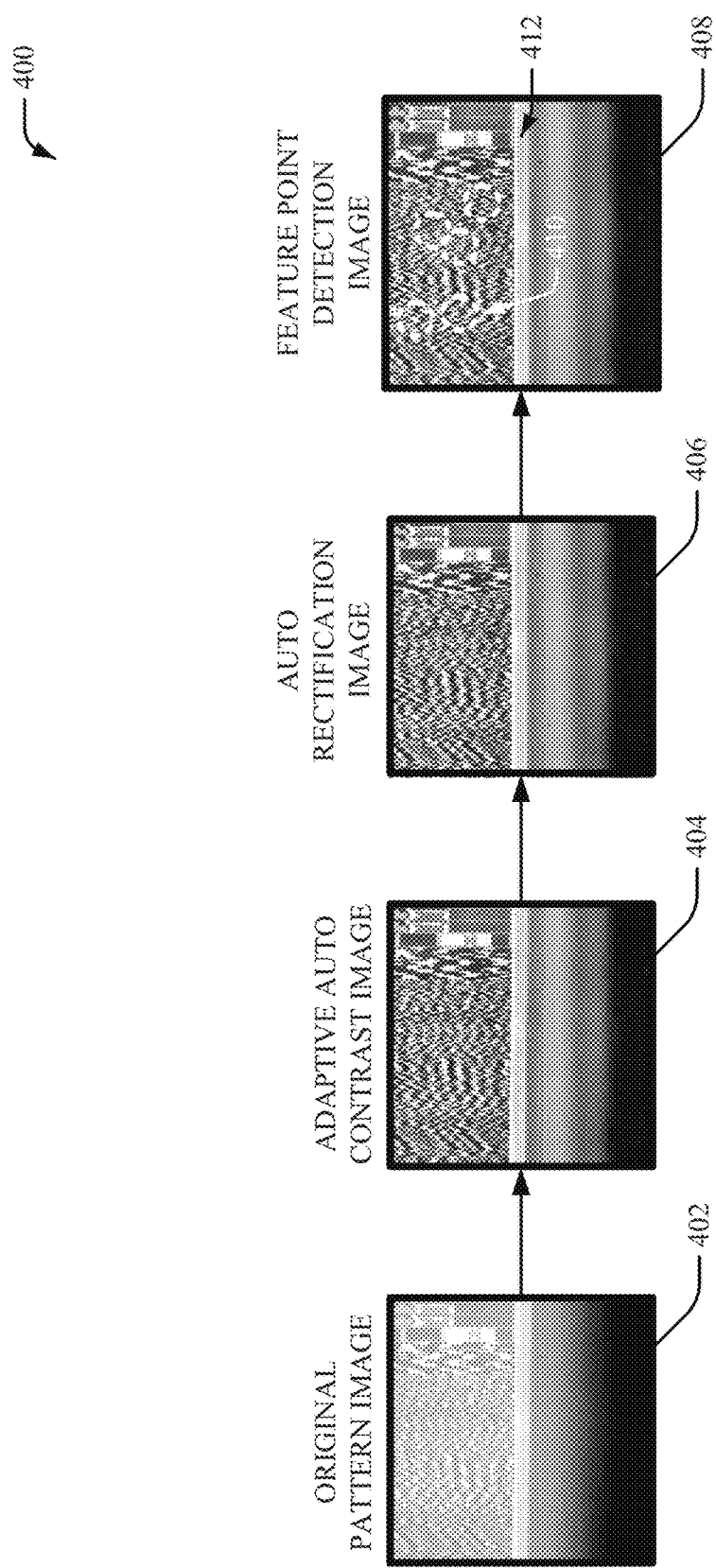
FIG. 4 illustrates a block diagram of an example, non-limiting system to facilitate integrated circuit defect detection using pattern images in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes an original pattern image 402, an adaptive auto contrast image 404, an auto rectification image 406 and a feature point detection image 408. The original pattern image 402 can be a pattern image received by the defect detection component 102 (e.g., received by the equalization component 104). For example, the original pattern image 402 can be a pattern image for the module under test 114. The original pattern image 402 can, for example, correspond to the pattern image 300. In an embodiment, the original pattern image 402 can be an original reflected pattern image acquired from an edge of the module under test 114 (e.g., an integrated circuit edge) using NIR and an infrared camera (e.g., an indium gallium arsenide camera). The adaptive auto contrast image 404 can be a modified version of the original pattern image 402. For example, the adaptive auto contrast image 404 can be an image obtained after adaptive contrast balancing is applied to the original pattern image 402. The auto rectification image 406 can be a modified version of the adaptive auto contrast image 404. For example, the auto rectification image 406 can be an image obtained after a rectification process that projects a pattern reference image and the adaptive auto contrast image 404 of the original pattern image 402 onto a common image plane. In one example, the auto rectification image 406 can be an image obtained after a rectification process that rotates the adaptive auto contrast image 404 (e.g., rotates the adaptive auto contrast image 404 by 0.55 degrees, etc.). The feature point detection image 408 can be a modified version of the auto rectification image 406. For example, the feature point detection image 408 can show a set of feature points 410 and a position of an edge portion 412 of the feature point detection image 408. The edge portion 412 can be, for example, a structure of the module under test 114 that facilitates a reduction of defects in the module under test 114. In an embodiment, the set of feature points 410 can be determined using a speeded up robust features (SURF) algorithm.

Figure 5:
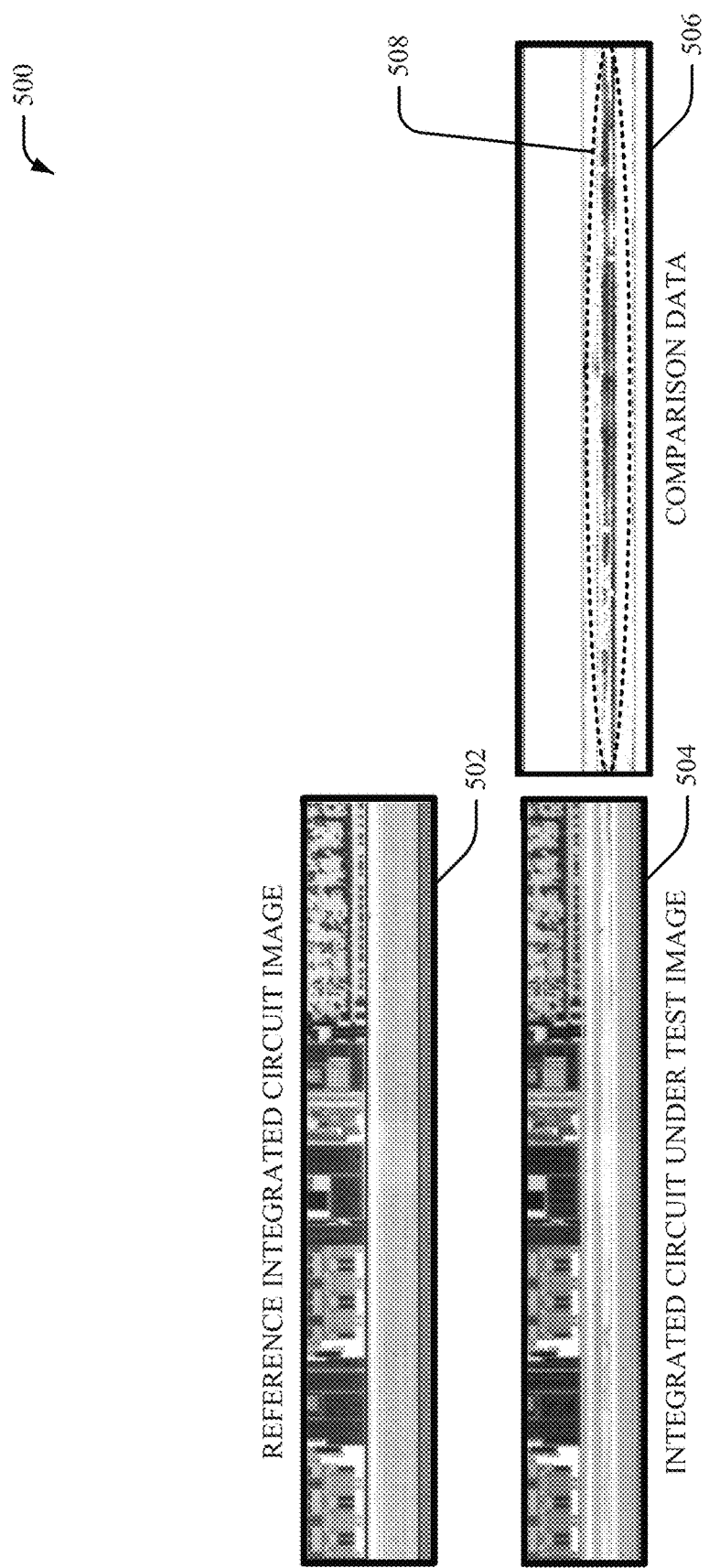
FIG. 5 illustrates a block diagram of another example, non-limiting system to facilitate integrated circuit defect detection using pattern images in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a reference integrated circuit image 502, an integrated circuit under test image 504 and comparison data 506. The reference integrated circuit image 502 can be, for example, a reference pattern image. For instance, the reference integrated circuit image 502 can be associated with a known-good reference integrated circuit that is previously fabricated with no defects. The integrated circuit under test image 504 can be, for example, a pattern image that corresponds to an integrated circuit under test. For instance, the integrated circuit under test image 504 can be a pattern image for the module under test 114. In an aspect, the reference integrated circuit image 502 can be a reference pattern image after equalization, rectification, and/or feature of interest detection. Furthermore, the integrated circuit under test image 504 can be a pattern image after equalization, feature point detection, and/or transformation. In an embodiment, the comparison component 108 can compare the reference integrated circuit image 502 and the integrated circuit under test image 504 to generate the comparison data 506. For example, the comparison data 506 can correspond to one or more differences between the reference integrated circuit image 502 and the integrated circuit under test image 504. The comparison data 506 can be generated by the defect detection component 102. In one example, the comparison data 506 can correspond to one or more differences between the reference integrated circuit image 502 and the integrated circuit under test image 504 after one or more cropping operations, one or more filtering operations, and/or one or more thresholding operations. In an aspect, a region 508 of the comparison data 506 can correspond to one or more defects in the integrated circuit under test image 504. For example, the region 508 can correspond to an embodiment where a region of the integrated circuit under test image 504 has a brighter intensity than a corresponding region of the reference integrated circuit image 502. Additionally or alternatively, the region 508 can correspond to an embodiment where a region of the integrated circuit under test image 504 has a lower intensity than a corresponding region of the reference integrated circuit image 502. Differences in intensity between the integrated circuit under test image 504 and the reference integrated circuit image 502 can correspond to one or more defect locations.

Figure 6:
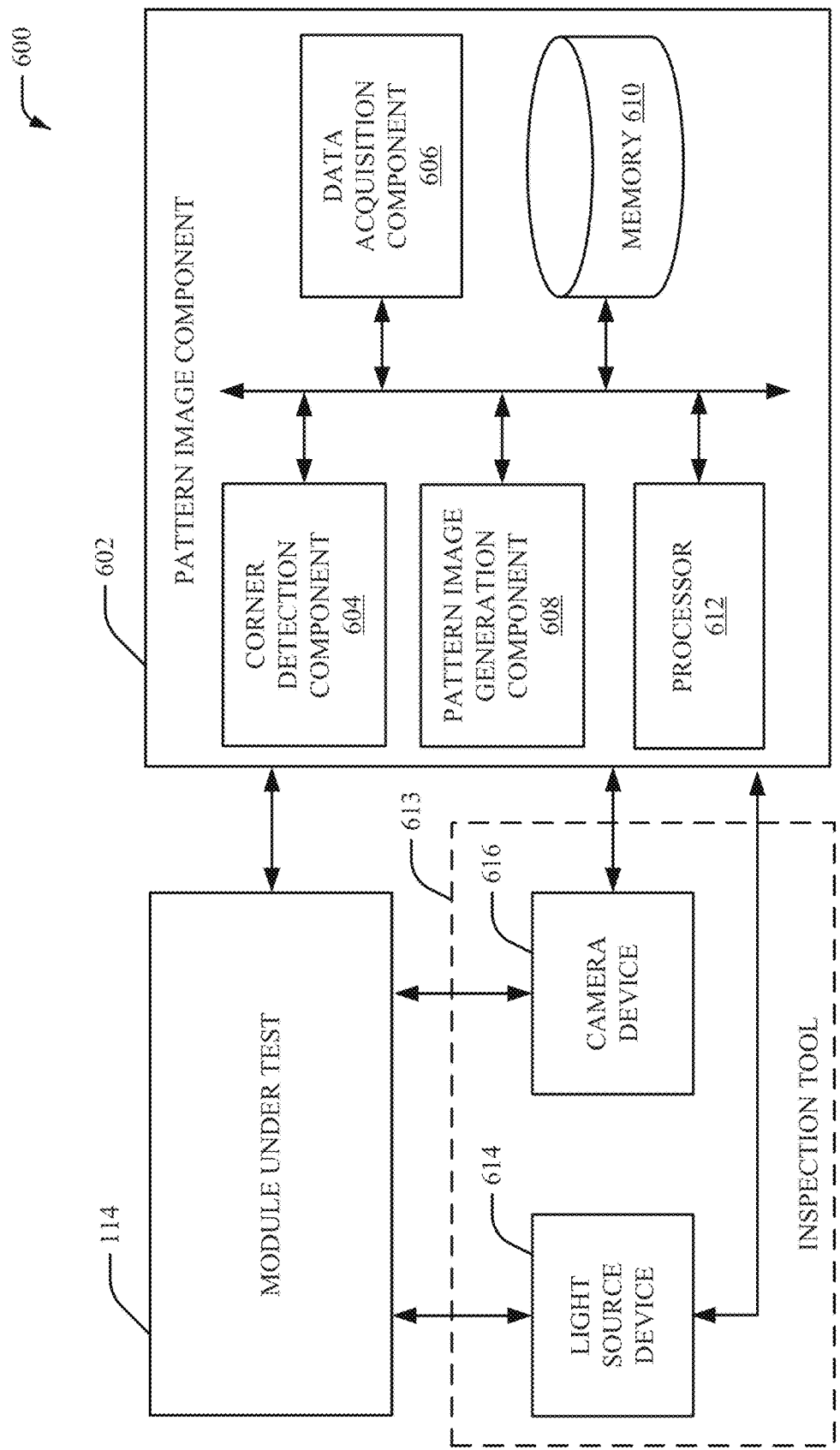
FIG. 6 illustrates a block diagram of an example, non-limiting system that includes a pattern image component in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity. The system 600 can facilitate integrated circuit defect detection by generating one or more pattern images in accordance with one or more embodiments described herein. In various embodiments, the system 600 can be a system associated with technologies such as, but not limited to, integrated circuit technologies, inspection tool technologies, defect detection technologies, data acquisition technologies, data analysis technologies, image processing technologies, image analysis technologies, computer technologies, machine learning technologies, artificial intelligence technologies, digital technologies, and/or other technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with a defect detection component, etc.) for carrying out defined tasks related to detection of one or more defects associated with an integrated circuit. The system 600 and/or components of the system can be employed to solve new problems that arise through advancements in technologies mentioned above, fabrication of integrated circuits, and/or computer architecture, and the like. One or more embodiments of the system 600 can provide technical improvements to integrated circuit systems, inspection tool systems, defect detection systems, data acquisition systems, data analysis systems, image processing systems, image analysis systems, computer systems, machine learning systems, artificial intelligence systems, digital systems, and/or other systems. One or more embodiments of the system 600 can also provide technical improvements to an integrated circuit that is a module under test by improving processing performance of the integrated circuit and/or improving processing efficiency of the integrated circuit.

In the embodiment shown in FIG. 6, the system 600 can include a pattern image component 602. As shown in FIG. 6, the pattern image component 602 can include a corner detection component 604, a data acquisition component 606, and a pattern image generation component 608. Aspects of the pattern image component 602 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the pattern image component 602 can also include memory 610 that stores computer executable components and instructions. Furthermore, the pattern image component 602 can include a processor 612 to facilitate execution of the instructions (e.g., computer executable components and corresponding instructions) by the pattern image component 602. As shown, the corner detection component 604, the data acquisition component 606, the pattern image generation component 608, the memory 610 and/or the processor 612 can be electrically and/or communicatively coupled to one another in one or more embodiments.

Additionally, in certain embodiments, the system 600 can also include the module under test 114 and an inspection tool 613. The inspection tool 613 can include, for example, a light source device 614 and/or a camera device 616. In one embodiment, the inspection tool 613 can be a microscope system. The module under test 114 can be, for example, an integrated circuit. The inspection tool 613 can be a tool (e.g., a machine) that analyzes the module under test 114. The light source device 614 can be, for example, a NIR light source that illuminates the module under test 114. In one example, the light source device 614 can be a light emitting diode that illuminates the module under test 114. In another example, the light source device 614 can be a halogen lamp that illuminates the module under test 114. In yet another example, the light source device 614 can be a NIR laser source associated with a laser scanning microscope that is employed to generate one or more pattern images associated with the module under test 114. In an embodiment, the light source device 614 can illuminate a backside of the module under test 114 (e.g., a backside of a silicon substrate of the module under test 114). As such, lateral spatial resolution of a pattern image associated with the module under test 114 and/or transmission of light through the module under test 114 can be improved. The camera device 616 can be a camera that generates one or more pattern images of the module under test 114. The camera device 616 can be, for example, an infrared camera that generates one or more pattern images of the module under test 114. In one example, the camera device 616 can be an indium gallium arsenide camera. In an embodiment, the pattern image component 602 can be implemented on the inspection tool 613. For example, the pattern image component 602 can be implemented on a controller (e.g., a microscope controller) of the inspection tool 613. In an embodiment, the pattern image component 602 can be implemented separate from the inspection tool 613. For example, the pattern image component 602 can be implemented as a processing unit separate from the inspection tool 613.

The pattern image component 602 can be associated with a data acquisition process that acquires data from the module under test 114. The pattern image component 602 can, for example, generate one or more pattern images (e.g., the module under test data 116). In an embodiment, the corner detection component 604 can detect one or more corners of the module under test 114. For example, one or more corners of the module under test 114 can be one or more edges of the module under test 114. In an aspect, the corner detection component 604 can identify a first corner of the module under test 114 (e.g., a bottom left corner of the module under test 114). For example, the corner detection component 604 can control a microscope stage associated with the module under test 114 to facilitate detection of the first corner of the module under test 114. In certain embodiments, a corner pre-alignment process and/or pre-focusing process can be performed to facilitate detection of one or more corners of the module under test 114. At the first corner of the module under test 114, the data acquisition component 606 can analyze the module under test 114. The data acquisition component 606 can analyze the module under test 114 at the first corner of the module under test 114 via the camera device 616.

In an embodiment, the data acquisition component 606 can analyze the module under test 114 at the first corner of the module under test 114 based on a field of view of the camera device 616. Additionally or alternatively, the data acquisition component 606 can analyze the module under test 114 at the first corner of the module under test 114 based on a set of dimensions for the module under test 114. In an embodiment, the data acquisition component 606 can determine a stage step size for the inspection tool 613. For example, the data acquisition component 606 can determine a stage step size for the inspection tool 613 based on a field of view of the camera device 616. In one example, a stage step size for the inspection tool 613 can be equal to a percentage (e.g., 90%) of the field of view of the camera device 616. In a repeating sequence of steps, a stage for the inspection tool 613 can be moved to a next location associated with the module under test 114. At the next location associated with the module under test 114, the camera device 616 of the inspection tool 613 can be auto-focused. For example, the camera device 616 of the inspection tool 613 can be auto-focused by maximizing a gradient value calculated for a pattern image associated with the module under test 114. In certain embodiments, a pattern image associated with the next location of the module under test 114 can be saved after analyzing the module under test 114 at the next location. For example, the pattern image generation component 608 can control the camera device 616 to generate a pattern image associated with the next location of the module under test 114. In another embodiment, a pattern image associated with the next location of the module under test 114 can be evaluated in real-time. A stage for the inspection tool 613 can be moved to a next location associated with the module under test 114 and repeated until a second corner of the module under test 114 is reached. Furthermore, a stage for the inspection tool 613 can be moved to a next location associated with the module under test 114 and repeated until a third corner of the module under test 114 is reached. Moreover, a stage for the inspection tool 613 can be moved to a next location associated with the module under test 114 and repeated until a fourth corner of the module under test 114 is reached. In one embodiment, a stage step size adjustment is applied to a current stage during movement of the camera device 616. In one example, stage step size adjustment can be calculated by determining a position of one or more reference features in a pattern image, such as, for example, an edge of the module under test 114. In an embodiment, the corner detection component 604 can determine the first corner, the second corner, the third corner and/or the fourth corner of the module under test 114 based on one or more computer vision algorithms. In another embodiment, the first corner, the second corner, the third corner and/or the fourth corner of the module under test 114 can be determined based on dimensionality of the module under test 114. In another embodiment, a location of the first corner, the second corner, the third corner and/or the fourth corner of the module under test 114 can be predefined.

In certain embodiments, a corner of the module under test 114, a location of the module under test 114, a stage step size of the inspection tool 613 and/or data associated with the module under test 114 can be determined based on one or more machine learning techniques. For example, the corner detection component 604 and/or the data acquisition component 606 can employ principles of artificial intelligence to facilitate determining a corner of the module under test 114, a location of the module under test 114, a stage step size of the inspection tool 613 and/or data associated with the module under test 114. The corner detection component 604 and/or the data acquisition component 606 can perform learning, explicitly or implicitly, with respect to determining a corner of the module under test 114, a location of the module under test 114, a stage step size of the inspection tool 613 and/or data associated with the module under test 114. In an aspect, the corner detection component 604 and/or the data acquisition component 606 can determine a corner of the module under test 114, a location of the module under test 114, a stage step size of the inspection tool 613 and/or data associated with the module under test 114 based on classifications, correlations, inferences and/or expressions associated with principles of artificial intelligence. For instance, the corner detection component 604 and/or the data acquisition component 606 can employ an automatic classification system and/or an automatic classification process to determine a corner of the module under test 114, a location of the module under test 114, a stage step size of the inspection tool 613 and/or data associated with the module under test 114. In one example, the corner detection component 604 and/or the data acquisition component 606 can employ a probabilistic and/or statistical-based analysis (e.g., factoring into the analysis utilities and costs) to learn and/or generate inferences with respect to determining a corner of the module under test 114, a location of the module under test 114, a stage step size of the inspection tool 613 and/or data associated with the module under test 114. In an aspect, the corner detection component 604 and/or the data acquisition component 606 can include an inference component (not shown) that can further enhance automated aspects of the corner detection component 604 and/or the data acquisition component 606 utilizing in part inference based schemes to facilitate determining a corner of the module under test 114, a location of the module under test 114, a stage step size of the inspection tool 613 and/or data associated with the module under test 114.

The corner detection component 604 and/or the data acquisition component 606 can employ any suitable machine-learning based techniques, statistical-based techniques and/or probabilistic-based techniques. For example, the corner detection component 604 and/or the data acquisition component 606 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the corner detection component 604 and/or the data acquisition component 606 can perform a set of machine learning computations associated with determining a corner of the module under test 114, a location of the module under test 114, a stage step size of the inspection tool 613 and/or data associated with the module under test 114. For example, the corner detection component 604 and/or the data acquisition component 606 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to determine a corner of the module under test 114, a location of the module under test 114, a stage step size of the inspection tool 613 and/or data associated with the module under test 114.

It is to be appreciated that the pattern image component 602 (e.g., the corner detection component 604, the data acquisition component 606 and/or the pattern image generation component 608) performs a data acquisition process and/or a pattern image generation process that cannot be performed by a human (e.g., is greater than the capability of a single human mind). For example, an amount of data processed, a speed of processing of data and/or data types processed by the pattern image component 602 (e.g., the corner detection component 604, the data acquisition component 606 and/or the pattern image generation component 608) over a certain period of time can be greater, faster and different than an amount, speed and data type that can be processed by a single human mind over the same period of time. The pattern image component 602 (e.g., the corner detection component 604, the data acquisition component 606 and/or the pattern image generation component 608) can also be fully operational towards performing one or more other functions (e.g., fully powered on, fully executed, etc.) while also performing the above-referenced data acquisition process and/or pattern image generation process. Moreover, the pattern image (e.g., the module under test data 116) generated by the pattern image component 602 (e.g., the corner detection component 604, the data acquisition component 606 and/or the pattern image generation component 608) can include information that is impossible to obtain manually by a user.

Figure 7:
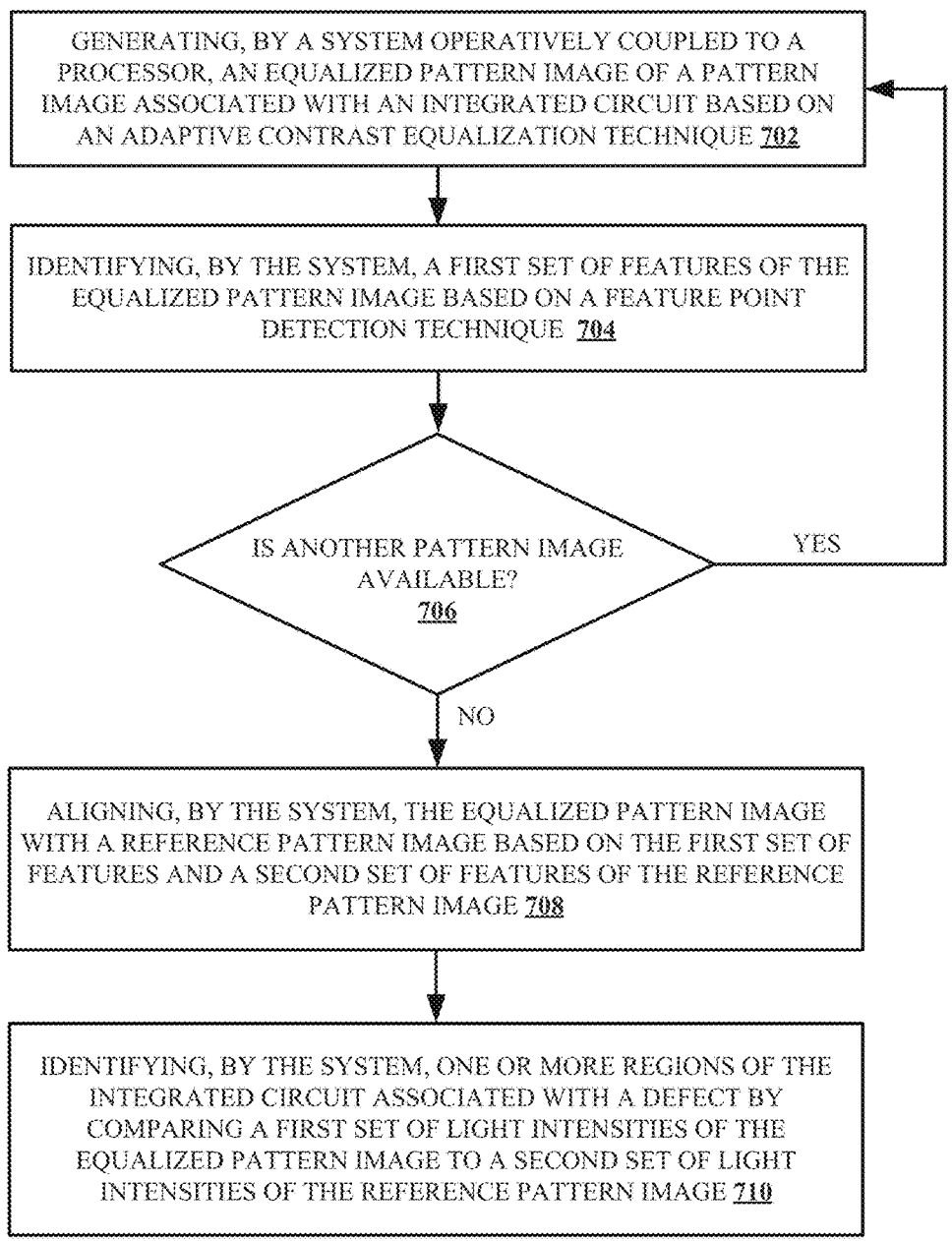
FIG. 7 illustrates a flow diagram of an example, non-limiting computer-implemented method for facilitating integrated circuit defect detection using pattern images in accordance with one or more embodiments described herein.

FIG. 7 illustrates a flow diagram of an example, non-limiting computer-implemented method 700 that facilitates integrated circuit defect detection using pattern images in accordance with one or more embodiments described herein. At 702, an equalized pattern image of a pattern image associated with an integrated circuit is generated, by a system operatively coupled to a processor (e.g., by equalization component 104), based on an adaptive contrast equalization technique. For example, contrast of the pattern image can be equalized to generate the equalized pattern image. In an embodiment, the integrated circuit can be a module under test.

At 704, a first set of features of the equalized pattern image is identified, by the system (e.g., by feature point detection component 106), based on a feature point detection technique. In one example, the feature point detection technique can be a SURF technique. In another example, the feature point detection technique can be a Harris-Stephens corner detection technique. However, it is to be appreciated that another type of feature point detection technique can be employed.

At 706, it is determined whether another pattern image is available. If yes, the computer-implemented method 700 returns to 702. If no, the computer-implemented method 700 proceeds to 708.

At 708, the equalized pattern image is aligned, by the system (e.g., by feature point detection component 106), with a reference pattern image based on the first set of features and a second set of features of the reference pattern image. For example, the first set of features of the pattern image and the second set of features of the reference pattern image can be matched together to align the pattern image with the reference image.

At 710, one or more regions of the integrated circuit associated with a defect are identified, by the system (e.g., by comparison component 108), by comparing a first set of light intensities of the equalized pattern image to a second set of light intensities of the reference pattern image. For example, a difference between the first set of light intensities of the equalized pattern image and the second set of light intensities of the reference pattern image can facilitate identification of one or more defects in the integrated circuit. In an aspect, a certain degree of difference between the first set of light intensities of the equalized pattern image and the second set of light intensities of the reference pattern image can indicate a defect in a specific location in the integrated circuit. In certain embodiments, the computer-implemented method 700 can further include acquiring, by the system, the pattern image from a camera that captures the pattern image using near-infrared illumination. In another embodiment, the computer-implemented method 700 can further include receiving, by the system, the pattern image from an inspection tool that generates the pattern image.

Figure 8:
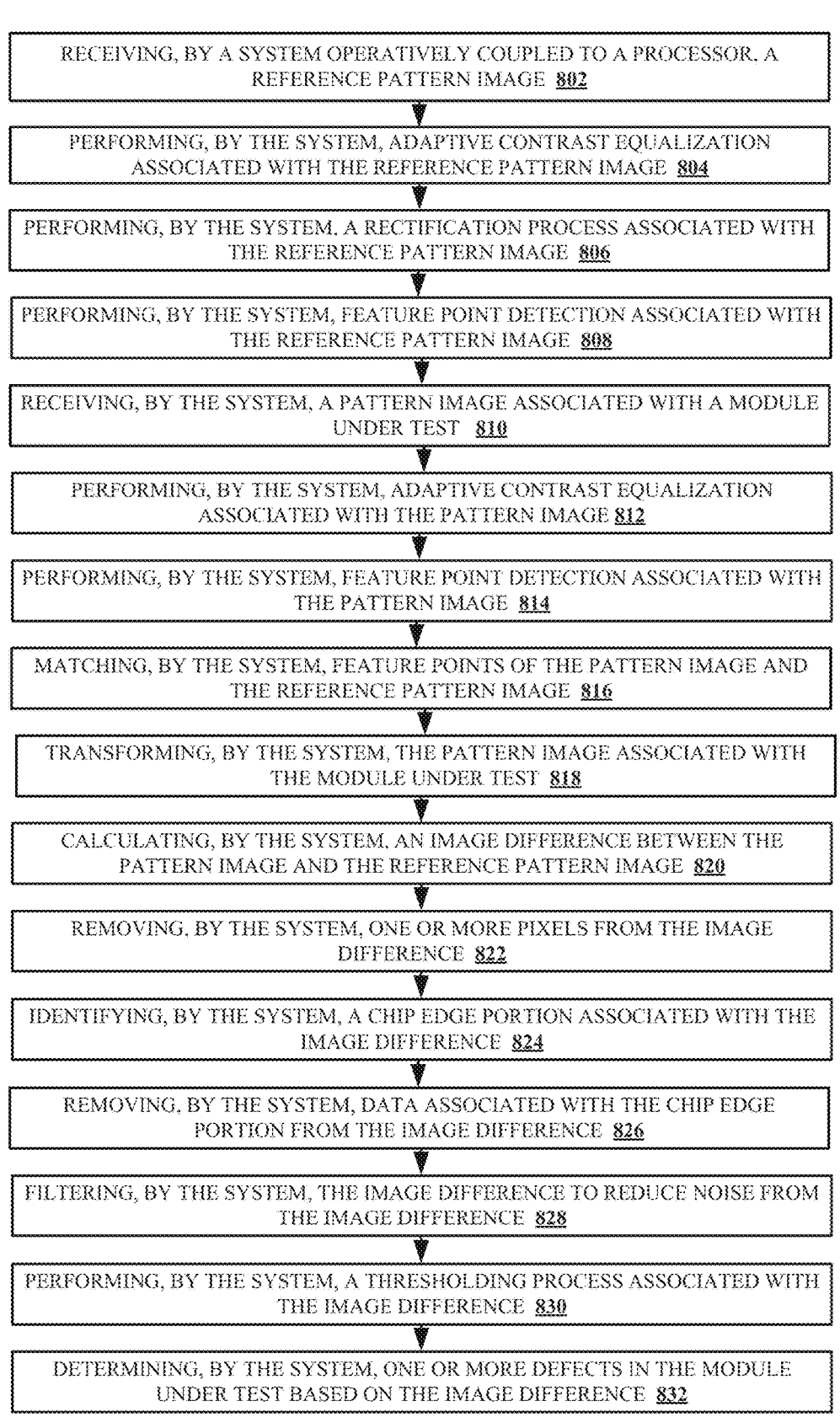
FIG. 8 illustrates a flow diagram of another example, non-limiting computer-implemented method for facilitating integrated circuit defect detection using pattern images in accordance with one or more embodiments described herein.

FIG. 8 illustrates a flow diagram of an example, non-limiting computer-implemented method 800 that facilitates integrated circuit defect detection using pattern images in accordance with one or more embodiments described herein.

At 802, a reference pattern image is received by a system operatively coupled to a processor (e.g., by equalization component 104). At 804, adaptive contrast equalization associated with the reference pattern image is performed by the system (e.g., by equalization component 104). At 806, a rectification process associated with the reference pattern image is performed by the system (e.g., by equalization component 104). At 808, feature point detection associated with the reference pattern image is performed (e.g., by feature point detection component 106). At 810, a pattern image associated with a module under test is received by the system (e.g., by equalization component 104). At 812, adaptive contrast equalization associated with the pattern image is performed by the system (e.g., by equalization component 104). At 814, feature point detection associated with the pattern image is performed (e.g., by feature point detection component 106). At 816, feature points of the pattern image and the reference pattern image are matched by the system (e.g., by comparison component 108). At 818, the pattern image associated with the module under test is transformed (e.g., by transformation component 202). At 820, an image difference between the pattern image and the reference pattern image is calculated (e.g., by comparison component 108). At 822, one or more pixels are removed, by the system (e.g., by transformation component 202), from the image difference. At 824, a chip edge portion associated with the image difference is identified by the system (e.g., by transformation component 202). At 826, data associated with the chip edge portion is removed, by the system (e.g., by transformation component 202) from the image difference. At 828, the image difference is filtered, by the system (e.g., by transformation component 202), to reduce noise from the image difference. At 830, a thresholding process associated with the image difference is performed by the system (e.g., by transformation component 202). At 832, one or more defects in the module under test is determined, by the system (e.g., by comparison component 108) based on the image difference.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and/or described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining one or more defects based on an image difference is established from a combination of electrical and mechanical components and circuitry, a human is unable to replicate or perform processing performed by the defect detection component 102 (e.g., the equalization component 104, the feature point detection component 106, the comparison component 108, and/or the transformation component 202) disclosed herein. For example, a human is unable to perform feature point detection, match feature points of a pattern image and a reference pattern image, remove pixels from an image difference, filter an image difference, etc.

Figure 9:
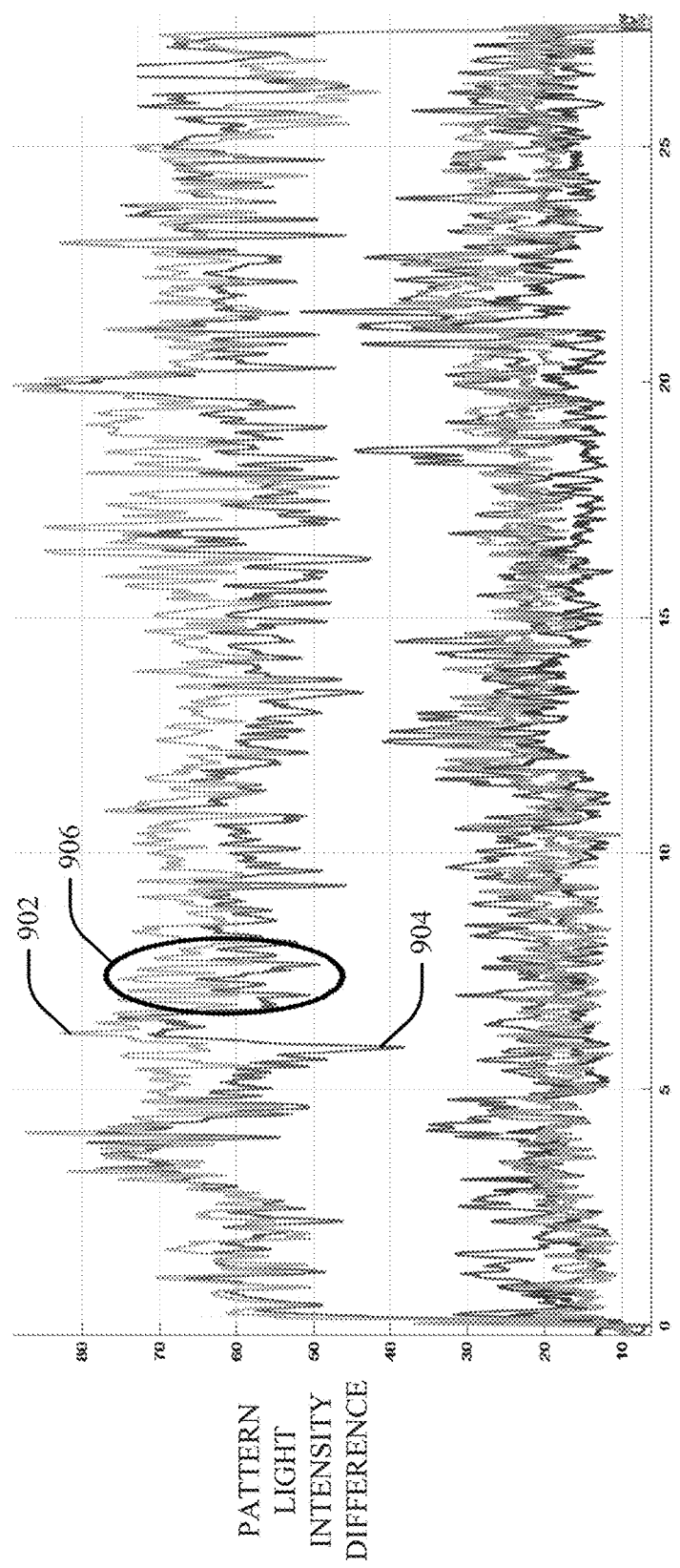
FIG. 9 illustrates a graph showing a comparison between light intensities at different locations of an integrated circuit in accordance with one or more embodiments described herein.

FIG. 9 illustrates a graph 900 showing a comparison between light intensities at different locations of an integrated circuit in accordance with one or more embodiments described herein. A horizontal axis of the graph 900 depicts various integrated circuit positions (e.g., integrated circuit locations). The integrated circuit positions can be, for example, measured in millimeters. A vertical axis of the graph 900 depicts pattern light intensity difference. The graph 900 includes pattern light intensity values 902 for a reference pattern image associated with a reference integrated circuit. The graph 900 also includes pattern light intensity values 904 for a pattern image associated with an integrated circuit under test (e.g., a module under test). As shown in the graph 900, a region 906 can illustrate a defect in the integrated circuit under test. For example, a difference in pattern light intensities between the pattern light intensity values 902 for the reference pattern image and the pattern light intensity values 904 for a pattern image in the region 906 can satisfy a defined degree of difference that represents a defect in the integrated circuit under test at an integrated circuit position between 5 mm and 10 mm.

Figure 10:
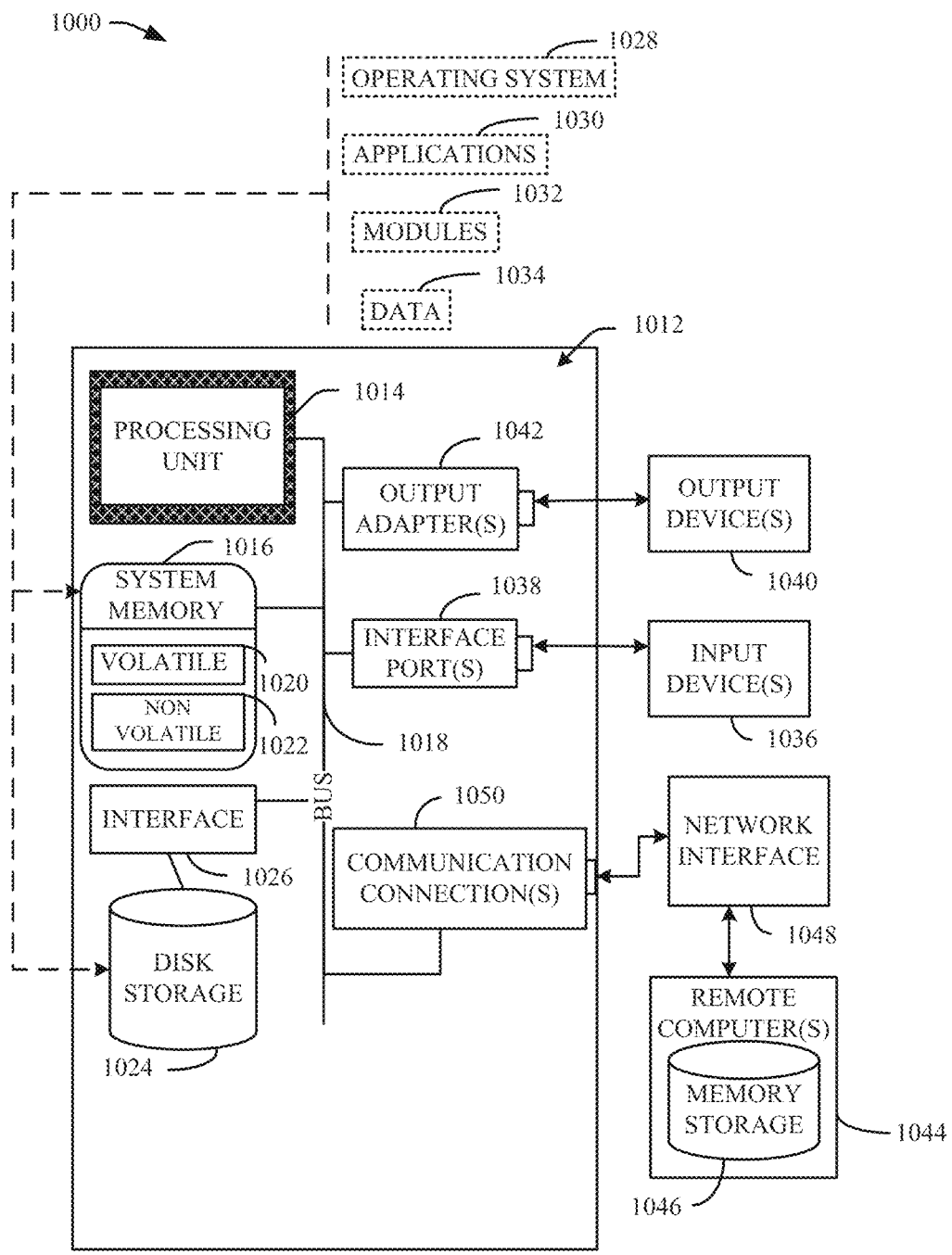
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
      an equalization component that:
         generates an equalized pattern image of a pattern image associated with a module under test based on an adaptive contrast equalization technique, and the
         generates an equalized reference pattern image from a reference pattern image using a RADON transform that rotates one or more portions of the reference pattern image;
      a feature point detection component that identifies a first set of features of the equalized pattern image based on a feature point detection technique and aligns the equalized pattern image with the equalized reference pattern image based on the first set of features and a second set of features of the reference pattern image; and
      a comparison component that compares a first set of light intensities of the equalized pattern image to a second set of light intensities of the equalized reference pattern image to identify one or more regions of the module under test that satisfy a defined criterion associated with a defect for the module under test.

2. The system of claim 1, wherein the equalization component acquires the pattern image from a camera that captures the pattern image using near-infrared illumination.

3. The system of claim 1, wherein the equalization component acquires the pattern image from a laser scanning microscope that captures the pattern image using near-infrared illumination.

4. The system of claim 1, wherein the equalization component acquires the pattern image from a microscope system that acquires the pattern image through a silicon substrate of the module under test.

5. The system of claim 1, wherein the feature point detection component identifies the first set of features of the equalized pattern image based on a speeded-up robust features technique.

6. The system of claim 1, wherein the feature point detection component identifies the first set of features of the equalized pattern image based on a Harris-Stephens corner detection technique.

7. The system of claim 1, wherein the comparison component compares the first set of features of the equalized pattern image to the second set of features of the equalized reference pattern image to determine a set of light intensity differences between the equalized pattern image and the equalized reference pattern image.

8. The system of claim 1, wherein the computer executable components comprise:
   a transformation component transforms the equalized pattern image to calculate an image difference between the equalized pattern image and the equalized reference pattern image.

9. The system of claim 8, wherein the transformation component filters the image difference to facilitate identification of the one or more regions of the module under test that satisfy the defined criterion.

10. The system of claim 8, wherein the transformation component removes a set of pixels from the image difference that satisfy a defined criterion associated with a camera that captures the pattern image to facilitate identification of the one or more regions of the module under test that satisfy the defined criterion.

11. The system of claim 1, wherein the comparison component compares the first set of light intensities of the equalized pattern image to the second set of light intensities of the equalized reference pattern image to facilitate improved performance for the module under test.

12. A computer-implemented method, comprising:
   generating, by a system operatively coupled to a processor, an equalized pattern image of a pattern image associated with an integrated circuit based on an adaptive contrast equalization technique;
   generating, by the system, an equalized reference pattern image from a reference pattern image using a RADON transform that rotates one or more portions of the reference pattern image;
   identifying, by the system, a first set of features of the equalized pattern image based on a feature point detection technique;
   aligning, by the system, the equalized pattern image with the equalized reference pattern image based on the first set of features and a second set of features of the equalized reference pattern image; and
   identifying, by the system, one or more regions of the integrated circuit associated with a defect by comparing a first set of light intensities of the equalized pattern image to a second set of light intensities of the equalized reference pattern image.

13. The computer-implemented method of claim 12, further comprising:
   acquiring, by the system, the pattern image from a camera that captures the pattern image using near-infrared illumination.

14. The computer-implemented method of claim 12, further comprising:
   receiving, by the system, the pattern image from an inspection tool that generates the pattern image.

15. The computer-implemented method of claim 12, wherein the identifying the first set of features of the equalized pattern image comprises identifying the first set of features of the equalized pattern image based on a speeded-up robust features technique.

16. The computer-implemented method of claim 12, wherein the identifying the first set of features of the equalized pattern image comprises identifying the first set of features of the equalized pattern image based on a Harris-Stephens corner detection technique.

17. The computer-implemented method of claim 12, wherein the identifying the one or more regions of the integrated circuit comprises improving fabrication quality of the integrated circuit or reliability of the integrated circuit.

18. A computer program product facilitating defect detection of an integrated circuit, the computer program product comprising a computer readable storage medium having program instructions embodied therewith, the program instructions executable by a processor to cause the processor to:

detect, by the processor, a location associated with the integrated circuit;

focus, by the processor, a lens of a camera at the location associated with the integrated circuit;

acquire, by the processor, data associated with the integrated circuit;

generate, by the processor, a pattern image for the integrated circuit based on the data;

generate, by the processor, an equalized pattern image of the pattern image based on an adaptive contrast equalization technique;

generate, by the processor, an equalized reference pattern image from a reference pattern image using a RADON transform that rotates one or more portions of the reference pattern image; and determine, by the processor, a defect of the integrated circuit based on a comparison of a first set of light intensities of the equalized pattern image and a second set of light intensities of the equalized reference pattern image.

19. The computer program product of claim 18, wherein the program instructions are further executable by the processor to cause the processor to:

determine, by the processor, a stage step size for an inspection tool associated with the integrated circuit based on a field of view value for the camera.

20. The computer program product of claim 18, wherein the program instructions are further executable by the processor to cause the processor to:

determine, by a processor, a corner of the integrated circuit based on a computer vision process.

* * * * *